INVENTOR
WILLIAM F. SHRIVER
BY
Arthus Frederick
ATTORNEY

June 24, 1969  W. F. SHRIVER  3,451,226
DRIP PAN HAVING DEFROSTING MEANS
Filed Nov. 29, 1967  Sheet 2 of 2

INVENTOR
WILLIAM F. SHRIVER
BY
ATTORNEY

United States Patent Office 3,451,226
Patented June 24, 1969

---

3,451,226
DRIP PAN HAVING DEFROSTING MEANS
William F. Shriver, Waynesboro, Pa., assignor to
Frick Company, Waynesboro, Pa., a corporation
of Pennsylvania
Filed Nov. 29, 1967, Ser. No. 686,456
Int. Cl. F25b *47/00*
U.S. Cl. 62—275          13 Claims

ABSTRACT OF THE DISCLOSURE

A drip pan for a refrigerating evaporator comprising a trough to receive ice and water from the evaporator upon defrosting of the latter and walls associated with the trough to define a relatively fluid tight chamber. A tube bank, having extended surface elements, is disposed in said chamber so that the extended surface elements are in abutment against the trough. The tube bank is connected to receive a heated fluid for flow of such fluid therethrough.

---

Drip pan having defrosting means

This invention relates to defrosting of evaporators of refrigeration systems and, more particularly, to drip pans cooperatively associated with evaporators to catch frost and water falling from the evaporator upon the defrosting of the latter.

Drip pans for refrigeration evaporators disposed in a refrigerated space must be provided with a heating means to prevent the re-freezing of the melted frost and ice released from the evaporator and to melt unmelted ice and slush collected in the pan to thereby facilitate the carry-off of the melted ice through drains. One such heating means is, as exemplified in the U.S. Patent No. 2,641,908 to La Porte, to dispose a coil conducting a hot, refrigerant gas in contact with the bottom surface of a drip pan. Another heating arrangement is to circulate heated air through a hollow chamber formed below the pan as disclosed in the U.S. patent to Hill, No. 1,890,085. Neither of these two types of drip pans have proved satisfactory. The type of drip pan having the hot gas coil has proved relatively inefficient since the heat transfer by conduction is small and heat dissipation by convection away from the pan to ambient atmosphere is relatively great. The drip pan of the type disclosed in the aforementioned Hill patent is unsatisfactory because of the corrosive effect of condensation of the moisture in the heated air circulated through the pan chambers when the pans are again cooled below the wet bulb temperature of the heated air. Also, such drip pans are relatively inefficient for the reason that a portion of the heat, from the heated air, is wasted in melting the frozen condensate in the pan chamber resulting from the previous defrost and cooling operation.

Accordingly, it is an object of the present invention to provide an improved drip pan for refrigerating evaporators, which drip pan quickly and efficiently melts ice and prevents the re-freezing of melted ice released from the evaporator upon the defrosting of the latter.

Another object of this invention is to provide an improved drip pan for refrigerating evaporators, which drip pan can be constructed of relatively small gage metal and yet has rigidity and strength.

A feature of the present invention is the provision of a finned hot gas conducting coil disposed in surface to surface contact, through the fins, with the pan or trough whereby conductive heat transfer to the trough is substantially increased.

Another feature of this invention is the provision of a fluid tight chamber below the trough, which confined space is indirectly heated by a coil, which feature obviates condensation within the chamber.

The present invention, therefore, contemplates a novel drip pan for receiving water and ice from a refrigerating evaporator during defrosting, drip pan comprises a trough connected in a fluid tight manner to a spaced bottom wall to thereby define a cul-de-sac or dead air chamber. A heat transfer coil or assembly is disposed within the dead air chamber and is connected to receive for flow therethrough a heated gas, such as gaseous refrigerant, when the evaporator associated with the drip pan is defrosted and it is necessary to apply heat to the drip pan. A drain means is provided to carry off the liquid trapped by the trough.

The invention will be more fully understood from the following detailed description thereof when considered in connection with the accompanying drawing wherein two embodiments of the invention are illustrated by way of example and, in which.

Figure 1:
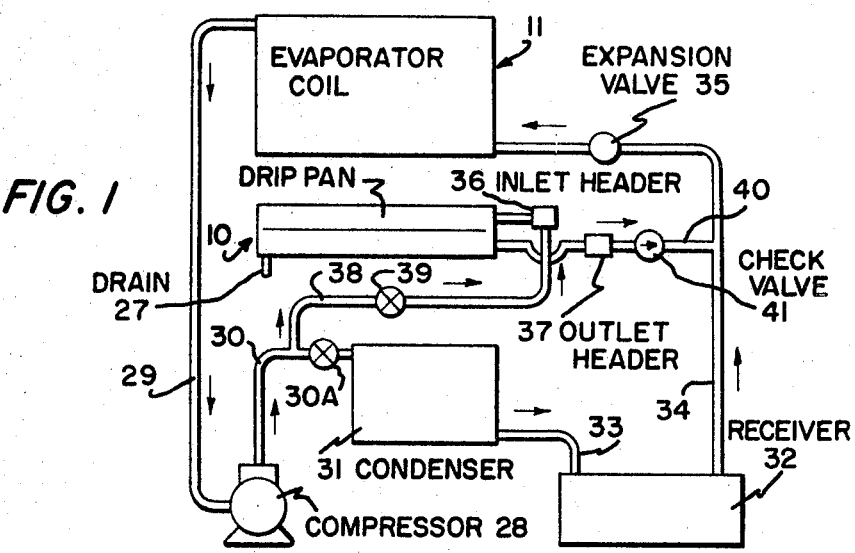
FIG. 1 is a schematic diagram of a refrigeration system showing the drip pan according to the present invention incorporated therein.

Now referring to the drawings and more particularly to FIGS. 1 to 3, the reference number 10 generally designates the drip pan according to this invention which is associated with a refrigerating coil or evaporator 11 and is preferably connected in a refrigeration system to receive hot gaseous refrigerant fluid for heating purposes, as hereinafter more fully explained. While the drip pan according to this invention is shown connected to receive hot gaseous refrigerant, it is to be understood that the drip pan may be connected to receive any hot fluid for heating purposes without departure from the scope and spirit of this invention.

Figure 2:
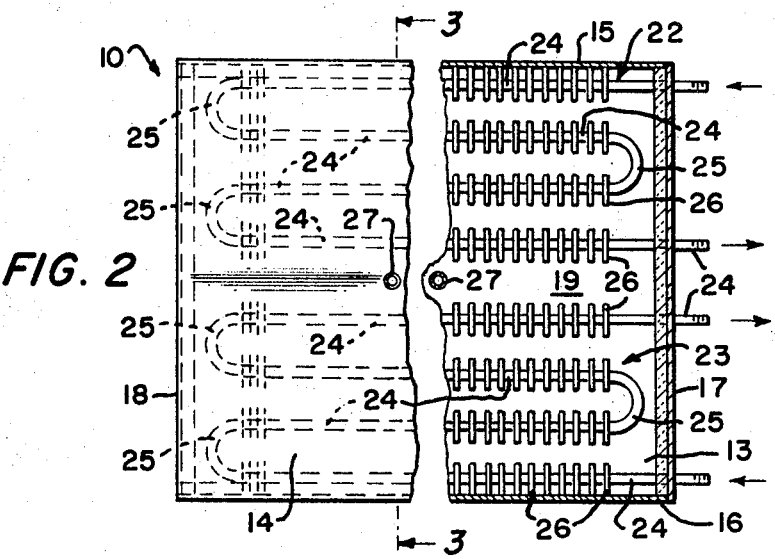
FIG. 2 is a top plan view, partly in cross section, of the drip pan according to one embodiment of this invention.
Figure 3:
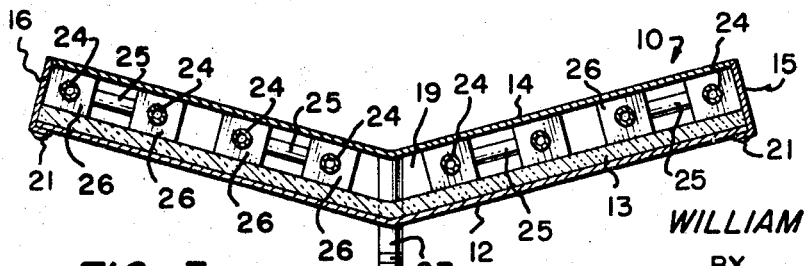
FIG. 3 is a cross sectional view taken substantially along line 3—3 of FIG. 2 and on a somewhat enlarged scale.

As shown in FIGS. 2 and 3, drip pan 10 is provided with a bottom wall or base plate 12 which has a shallow V-shape in cross section and a layer of heat insulating material 13 disposed on the upper surface of the base plate. A pan or trough 14, having a shape complementary to base plate 12, is disposed in spaced relation to base plate 12. Side walls 15 and 16 and end walls 17 and 18 are connected to trough 14 and base plate 12 to define therebetween a dead air space or chamber 19. Side walls 15 and 16 are joined along one edge to the peripheral edge portions of trough 14, as by welding, while the other end portions of side walls 15 and 16 are provided with a flange 20 which overlaps and is secured to base plate 12 by a plurality of bolts, rivets 21 or the like. A gasket (not shown) may be disposed between the adjacent surfaces of flange 20 and base plate 12 to insure a fluid tight joint. The end walls 17 and 18 are secured at the peripheral edge portions, as by welding, to the end portions of base plate 12, trough 14 and side walls 15 and 16. To provide for heating trough 14, a heat exchange means comprising two coils 22 and 23 is disposed in chamber 19.

Each of the coils 22 and 23 consists of a tube or pipe having a plurality of parallel, straight portions 24 interconnected by return bend portions 25 to provide series flow of fluid through the straight portions. Each of the coils is provided with a plurality of extended surface elements or fins 26 which are secured to the pipe in any suitable manner, such as by welding, brazing or swaging, to provide good heat conductive bond between the fins and the pipe. The fins 26 are square in configuration and of such dimensions that one flat surface of the fin engages the surface of heat insulating layer 13 while the opposite flat surface of the fin abuts the undersurface of trough 14. Since the finned coils 22 and 23 structurally serve as stiffeners, base plate 12, trough 14, side walls 15 and 16 and end walls 17 and 18 may be of relatively thin gage metal sheeting. Each of the coils 22 and 23 is connected to receive a heated fluid, as for example, hot gaseous refrigerant in the manner illustrated in FIG. 1 and hereinafter described. The carry-off of the defrosted ice trapped on trough 14 in the form of water, is provided for by one or more drain connections 27 which extend through base plate 12, heat insulating layer 13, chamber 19 and trough 14 at the apex of the elements. While the heat exchange means of drip pan 10 is shown and has been described as consisting of two coils, it is to be understood that the heat exchange means may comprise a single coil or more than two coils without departure from the scope and spirit of this invention.

Drip pan 10 is connected to be suspended below evaporator 11 by brackets or hangers not shown. Obviously, drip pan 10 can be held in proper relation to evaporator 11 by any suitable means without deviating from the invention.

As illustrated schematically in FIG. 1, each of the coils 22 and 23 of drip pan 10 may be connected to receive hot gaseous refrigerant from a conventional refrigeration system in which the evaporator is a component. The conventional refrigeration system essentially comprises a compressor 28 which is connected through suction pipe 29 to receive gaseous refrigerant from evaporator 11. The compressor discharges compressed, hot gaseous refrigerant through discharge pipe 30 into a condenser 31. A normally open valve 30A is disposed to control flow through pipe 30. The refrigerant is cooled and condensed in condenser 31 and the liquid refrigerant is conducted into a storage vessel or receiver 32 by way of pipe 33. Liquid refrigerant is conducted from receiver 32 to the evaporator 11 via pipe 34 in accordance with demand as controlled by expansion valve 35. Any of many known defrosting means and methods may be employed to periodically defrost evaporator 11. As shown, each coil 22 and 23 is connected to an inlet header 36 and an outlet header 37 to respectively receive hot gaseous refrigerant and discharge cooled hot gaseous refrigerant. The inlet header 36 is connected to discharge pipe 30, via line 38, to receive hot gaseous refrigerant discharged from compressor 28. A valve 39 is disposed in pipe 38 to control flow of refrigerant therethrough. Outlet header 37 is connected by discharge line 40 to pipe 34. A check valve 41 is positioned in line 40 to insure flow of refrigerant only through line 40 into pipe 34.

In the defrost cycle of operation of the refrigeration system here in described, valve 30A in discharge pipe 30 is closed and hot gaseous refrigerant is flowed, via line 38 into inlet header 36 and, thence, through coils 22 and 23. In flowing through coils 22 and 23, heat is conducted quickly and rapidly to trough 14. Since fins 26 contact the under surface of trough 14 a large area of heat conductivity is provided and thus quick and efficient heat transfer is achieved. Also the air trapped in chamber 19 is quickly heated since convection losses are nil. Rapid and efficient heat transfer is further promoted by the fact that trough 14 can be composed of relatively thin gage metal sheeting, coils 22 and 23 providing rigidity to the trough and the drip pan assembly in general. The cooled refrigerant gas discharges from coils 22 and 23 into outlet header 37 and, from the latter, to pipe 34 via line 40. The melted ice is conducted from trough 14 by drain connection 27. After completion of the defrost cycle, normal refrigerant flow to evaporator 11 is restored by closing valve 39 and opening valve 30A.

Figure 4:
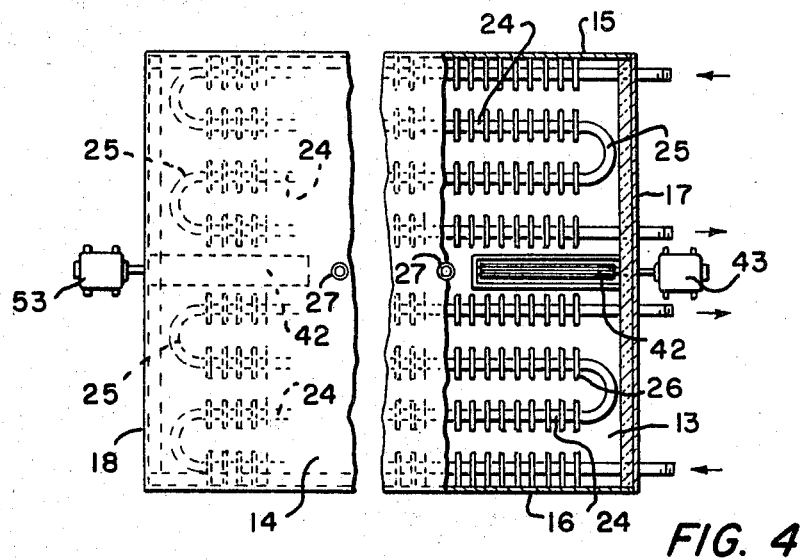
FIG. 4 is a view similar to FIG. 2 showing another embodiment of the present invention.
Figure 5:
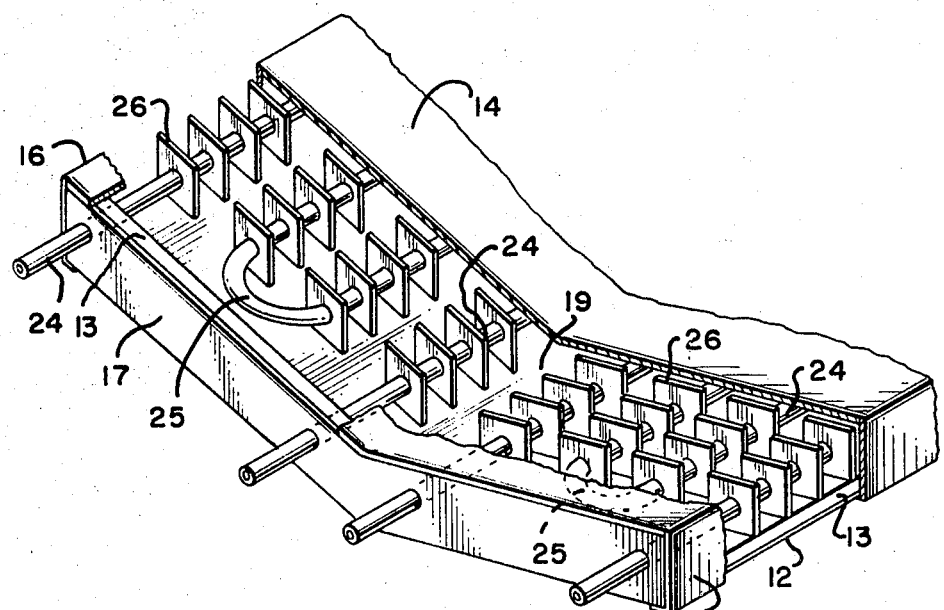
FIG. 5 is a fragmentary view in perspective with parts broken away for illustration purposes of the drip pan shown in FIG. 2.

In FIG. 4 is shown another embodiment of the invention which differs from the embodiment shown in FIGS. 1, 2, 3 and 5 only in that chamber circulation means is provided in chamber 19. The chamber circulation means may comprise one or more blowers 42 driven by rotary motors 43. The blowers 42 may be of the type designated a tangential blower assembly manufactured by the Lau Blower Company of Dayton, Ohio, U.S.A. The blowers would function to rapidly circulate air in chamber 19 to achieve faster heat transfer to trough 14 than would be achieved solely by the convection circulation in the embodiment shown in FIGS. 1, 2, 3 and 5. Since drip pan 10A, shown in FIG. 4, is the same as the embodiment shown in FIGS. 1, 2, 3 and 5 except for the addition of blowers 42 and 43, the same reference numbers as in the embodiment shown in FIGS. 1, 2, 3 and 5 have been used to designate like parts in drip pan 10A.

It is believed now readily apparent that the present invention provides an improved drip pan for a refrigeration evaporator which more efficiently achieves heat transfer between a heated fluid and the pan or trough of the drip pan than heretofore known drip pans. It is a drip pan which is relatively inexpensive since it is constructed of relatively thin gage metal and thereby effects a saving of fabrication cost. It is also a drip pan in which heat transfer by conductivity and convection is substantially increased over heretofore known drip pans.

Although but two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A drip pan for a refrigeration evaporator to receive and trap ice and water from the evaporator upon defrosting of the latter, the drip pan comprising
   (a) trough,
   (b) wall means connected to said trough to define with the latter a fluid tight chamber, and
   (c) a bank of tubes within the fluid tight chamber,
   (d) said bank of tubes having extended surface elements and being connected to receive a heated fluid for flow therethrough.

2. The apparatus of claim 1 wherein a drain is provided to conduct water away from the trough.

3. The apparatus of claim 1 wherein said wall means includes a base plate having a layer of heat insulating material adjacent the inner surface of the base plate.

4. The apparatus of claim 1 wherein a blower is disposed in the chamber to effect forced circulation of air within the chamber.

5. In combination with a refrigerating evaporator, a drip pan to receive water and ice from the evaporator upon defrosting of the latter comprising
   (a) a trough,
   (b) a bottom wall disposed in spaced parallel relationship with the trough,
   (c) side walls and end walls extending and secured to the trough and said bottom wall to define therebetween a substantially fluid tight chamber,
   (d) a bank of tubes having a plurality of extended surface elements disposed in said chamber so that the extended surface elements abut the inner surfaces of the trough and bottom wall, and (e) means for connecting said bank of tubes to a source of heated fluid when the evaporator is being defrosted.

6. The combination of claim 5 wherein said extended surface elements are a plurality of relatively closely spaced parallel fins having opposite flat edge portions which engage the trough.

7. The combination of claim 5 wherein said extended surface elements are relatively closely spaced, parallel fins of square configuration.

8. The combination of claim 5 wherein said trough and bottom wall have a shallow V-shaped configuration in cross section.

9. The combination of claim 5 wherein said bottom wall includes a layer of heat insulating material adjacent its inner surface.

10. The combination of claim 5 wherein said bank of tubes consists of at least two separate sections, each being connected to receive flow of heated fluid therethrough.

11. The combination of claim 5 wherein a forced air circulation means is disposed in the chamber.

12. The combination of claim 5 wherein said trough, bottom wall, side walls and end walls are constructed of relatively thin metallic sheets.

13. The combination of claim 5 wherein a drain connection is provided in communication with the upper surface of the trough to carry off the water.

References Cited

UNITED STATES PATENTS

| | | | |
|---|---|---|---|
| 2,494,481 | 1/1950 | MacMaster | 62—277 |
| 2,637,983 | 5/1953 | Malkoff | 62—278 |
| 2,727,362 | 12/1955 | Philipp | 62—277 |

WILLIAM J. WYE, *Primary Examiner.*

U.S. Cl. X.R.

62—277, 285